(12) United States Patent
Bybee et al.

(10) Patent No.: US 11,919,525 B2
(45) Date of Patent: Mar. 5, 2024

(54) POINT CLOUD OCCLUSION MAPPING FOR AUTONOMOUS VEHICLES

(71) Applicant: Autonomous Solutions, Inc., Mendon, UT (US)

(72) Inventors: Taylor C. Bybee, Mendon, UT (US); Jeffrey L. Ferrin, Smithfield, UT (US)

(73) Assignee: Autonomous Solutions, Inc., Mendon, UT (US)

( * ) Notice: Subject to any disclaimer, the term of this patent is extended or adjusted under 35 U.S.C. 154(b) by 427 days.

(21) Appl. No.: 16/992,913

(22) Filed: Aug. 13, 2020

(65) Prior Publication Data

US 2021/0046943 A1 Feb. 18, 2021

Related U.S. Application Data

(60) Provisional application No. 62/886,051, filed on Aug. 13, 2019.

(51) Int. Cl.
*G06V 20/56* (2022.01)
*B60W 50/02* (2012.01)
*G06T 7/00* (2017.01)
*G06V 10/26* (2022.01)

(52) U.S. Cl.
CPC ....... *B60W 50/0205* (2013.01); *G06T 7/0008* (2013.01); *G06V 10/26* (2022.01); *G06V 20/56* (2022.01); *B60W 2050/021* (2013.01); *B60W 2050/0215* (2013.01); *B60W 2420/42* (2013.01); *B60W 2420/52* (2013.01); *B60W 2556/25* (2020.02)

(58) Field of Classification Search
None
See application file for complete search history.

(56) References Cited

U.S. PATENT DOCUMENTS

| | | | |
|---|---|---|---|
| 10,290,116 B2 * | 5/2019 | Laugier | G06T 7/277 |
| 11,054,265 B2 * | 7/2021 | Geissler | G01C 21/32 |
| 2011/0050940 A1 | 3/2011 | Lanz et al. | |
| 2011/0064302 A1 | 3/2011 | Ma et al. | |
| 2017/0039765 A1 | 2/2017 | Zhou et al. | |
| 2017/0192436 A1 | 7/2017 | Min et al. | |
| 2017/0357267 A1 | 12/2017 | Foster et al. | |
| 2020/0148215 A1 * | 5/2020 | Mohajerin | G05D 1/0088 |

OTHER PUBLICATIONS

Yapo et al., "A Probabilistic Representation of LiDAR Range Data for Efficient 3D Object Detection," IEEE Computer Society Conference on Computer Vision and Pattern Recognition Workshops, Jun. 2008, pp. 1-8. (Year: 2008).*

(Continued)

*Primary Examiner* — Todd Melton

(57) ABSTRACT

Some embodiments of the invention include a method for updating an occlusion probability map. An occlusion probability map represents the probability that a given portion of the sensor field is occluded from one or more sensors. In some embodiments, a method may include receiving field of view data from a sensor system; producing a probabilistic model of the sensor field of view; and updating an occlusion probability map using the probabilistic model and field of view data.

18 Claims, 7 Drawing Sheets

(56) References Cited

OTHER PUBLICATIONS

Saleh et al., "Estimating the 2D Static Map Based on Moving Stereo Camera," 24th International Conference on Automation and Computing (ICAC), Sep. 2018, pp. 1-5. (Year: 2018).*
Jo et al., "Cloud Update of Tiled Evidential Occupancy Grid Maps for the Multi-Vehicle Mapping," Sensors (Basel), vol. 18(12): 4119, Dec. 2018, pp. 1-17. (Year: 2018).*
Bybee, T.C., and Herrin, J.L., "Algorithm for point cloud occlusion mapping on an autonomous ground vehicle", Autonomous ground systems (AGS) Technical Session, pp. 1-8 (Aug. 13-15, 2019).
Naguib, A.M., et al., "Cognitive Recognition Under Occlusion for Visually Guided Robotic Errand Service", Intelligent Autonomous Systems 13, Advances in Intelligent Systems and Computing, vol. 302, pp. 81-94 (2011).
International Search Report and written opinion received for PCT Patent Application No. PCT/US2020/046197, dated Feb. 19, 2021, 09 pages.

* cited by examiner

POINT CLOUD OCCLUSION MAPPING FOR AUTONOMOUS VEHICLES

STATEMENT AS TO RIGHTS TO INVENTIONS MADE UNDER FEDERALLY SPONSORED RESEARCH AND DEVELOPMENT

This invention was made with government support under SBIR contract W56HZV-17-C-0050 awarded by DOD. The government has certain rights in the invention.

BACKGROUND

For safe navigation through an environment, autonomous ground vehicles rely on sensory inputs such as cameras, LiDAR, and radar for detection and classification of obstacles and impassable terrain. These sensors provide data representing 3D space surrounding the vehicle. Often this data is obscured by dust, precipitation, objects, or terrain, producing gaps in the sensor field of view. These gaps, or occlusions, can indicate the presence of obstacles, negative obstacles, or rough terrain. Because sensors receive no data in these occlusions, sensor data provides no explicit information about what might be found in the occluded areas.

SUMMARY

Embodiments of the invention include a method for updating an occlusion probability map. In some embodiments, a method may include receiving field of view data from a sensor system; producing a probabilistic model of the sensor field of view; and updating an occlusion probability map using the probabilistic model and field of view data.

In some embodiments, the method may include extracting nondrivable paths for an autonomous vehicle based on the occlusion probability map.

In some embodiments, the sensor system comprises a lidar, radar, or camera.

In some embodiments, a method may include determining whether a cell of a plurality of cells within a field of view has been observed; in the even the cell has been observed, setting the occlusion probability of the cell to zero; in the even the cell has not been observed, determining whether the cell is independent; in the event the cell is not independent, setting the occlusion probability of the cell to the previous occlusion probability; in the event the cell is not independent, determining whether the cell is within the field of view of a sensor system; in the event the cell is within the field of the view of the sensor system, setting the occlusion probability using an occlusion probability update function; and in the event the cell is not within the field of the view of the sensor system, setting the occlusion probability of the cell to the previous occlusion probability.

In some embodiments, the occlusion probability update function includes a function of the scan cell detection probability and the previous occlusion probability. In some embodiments, the occlusion probability update function comprises $m_{r,c}^{k} = 1-(1-s_{r,c})(1-m_{r,c}^{k-1})$.

In some embodiments, the sensor system comprises a lidar, radar, or camera.

In some embodiments, the method further includes determining whether the cell is independent comprises determining whether the sensor has moved some fraction amount of a grid cell size.

Some embodiments may include autonomous vehicle that includes a vehicle platform; one or more sensors coupled with the vehicle platform; and a processor communicatively coupled with the one or more sensors. The processor may execute any of the occlusion mapping or updating methods described in this document.

In some embodiments, the vehicle platform comprises a steering mechanism in communication with the processor, and the processor communicates steering commands to the steering mechanism based on the occlusion probability. In some embodiments, the vehicle platform comprises a braking mechanism in communication with the processor, and the processor communicates braking commands to the braking mechanism based on the occlusion probability.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

DETAILED DESCRIPTION

Figure 1:
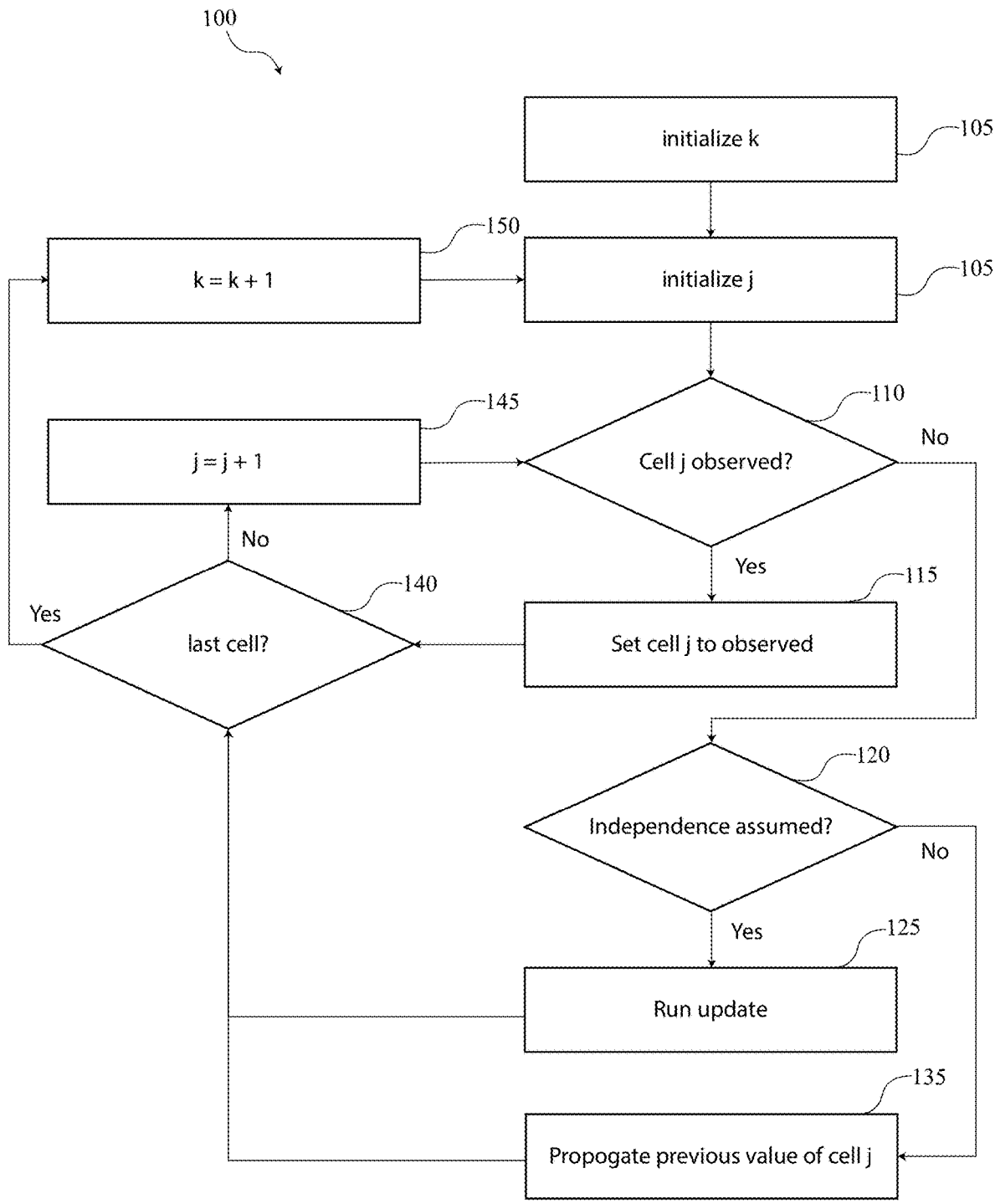
FIG. 1 is a flowchart of an example process for updating a cell according to some embodiments.

Autonomous vehicles rely on exteroceptive sensors to gather information about the environment. Many sensor processing algorithms focus on what is explicitly presented in the sensor data. Information may also be garnered by what is inferred by the data. Occlusions, for example, can fall into this category. Occlusions can be defined as a blockage which prevents a sensor from gathering data in a location. For example, occlusions can be seen as shadows in LiDAR data. While the sensor data itself does not indicate what is in the occluded areas, occlusions can represent negative obstacles such as drop-offs or areas behind large obstacles. These areas are important to identify for autonomous vehicle obstacle detection and avoidance to work properly.

In some embodiments, point cloud data generated from an autonomous vehicle by a 3D LiDAR, structured light, or stereo camera system (or any other system) may include information about the objects within a field of view. Due to the distribution of the points in each point cloud, for example, the current sensor field of view may be inferred. If the current sensor field of view does not match an ideal sensor field of view, it may, for example, indicate that something may be occluding the sensor. Some embodiments include algorithms, processes, methods, or systems that model the probability of sensor occlusion in a map by incorporating an ideal sensor field of view model compared against sensor data over time.

In some embodiments, an occlusion mapping algorithm may model an area around an autonomous vehicle as a grid map where each grid cell represents the probability of occlusion from one or more sensors mounted on the vehicle. This can be an occlusion probability map that may be updated regularly. Updating the occlusion probability map may require knowledge of the sensor field of view (FOV), which may be represented as a probability mass function centered around the vehicle.

In some embodiments, an inertially-based coordinate system may be used for the occlusion mapping, which may be denoted by row-column grid coordinates (r, c), and a vehicle-centric coordinate system for the sensor field-of-view model, denoted by row-column grid coordinates (r̂, ĉ). Embodiments of the invention may be used in any type of coordinate system.

In some embodiments, it can be assumed that only one sensor data stream can be input into this algorithm. This may, for example, be generalized to any number of sensors by running an update equation for each sensor at their respective scene scan rate. Each sensor may retain its own FOV model but share the occlusion probability map.

In some embodiments, a probabilistic model can describe the probability of detection within an ideal sensor field of view (FOV). A 2D detection probability grid map G can be defined. $g_{\hat{r},\hat{c}}$ can be used to denote the detection probability in the grid cell at index (r̂, ĉ) relative to the vehicle. This map may be in the vehicle frame, assuming the sensor mounting is static and/or the sensor scanning pattern is repeating over some small time period $\Delta T$. The grid map G may represent a probability mass function (pmf) of getting a sensor return in each grid cell. That is, $\Sigma_G g_{\hat{r},\hat{c}} = 1.0$. It can be viewed as a point density function.

There are several methods for populating G. These may include, for example, using empirical data to estimate each cell value using normalized histogram counts or, as another example, simulating the sensor field of view based on an ideal model. In either case, a 2D plane at ground height may represent an ideal, non-occluded world the sensor FOV model is based on.

With the pmf grid G, the probability that a grid cell at index (r̂, ĉ) is detected by any point when N points are sensed in a scan of the area can be determined. For example, another grid S, the cell scan detection probability grid, can be created to store this information with each cell denoted as $S_{\hat{r},\hat{c}}$. This grid may be populated from the information in G. It can be assumed that each point in a FOV scan is sensed independently of one another. This can be modeled by a Binomial distribution with parameters N and $g_{\hat{r},\hat{c}}$, where it determines the probability of a single cell detected in any of N point samples. Because these points may not be truly independent of one another, an aggressiveness scale factor $\alpha$ may be introduced to tune the system for reasonable results. This aggressiveness factor may change the effective number of points sampled in a scan of the scene to better approximate the points as a random process. With the aggressiveness factor, the cell scan detection probability for each cell in grid S may be given by $S_{\hat{r},\hat{c}} = 1 - (1 - g_{\hat{r},\hat{c}})^{\alpha N}$.

In some embodiments, the grids G and S may be defined in a vehicle-frame. Using the vehicle pose at a given time, the frame may be converted from the vehicle frame coordinates (r̂, ĉ) to corresponding inertial frame coordinates (r, c). For instance, $g_{\hat{r},\hat{c}}$ or $S_{\hat{r},\hat{c}}$ refers to the vehicle frame coordinates and $g_{r,c}$ or $S_{r,c}$ refers to the inertial frame coordinates with the same vehicle in mind.

In this way, for example, the grids G and S may only need only to be computed once and stored. When querying between inertial-frame and vehicle-frame grid coordinates, various types of sampling interpolation may be used such as, for example, nearest neighbor or bilinear interpolation.

In some embodiments, a 2D occlusion probability grid map M can be defined to denote, for example, the occlusion probability for grid cell at index (r, c) in the inertial frame at time k. For example: $m_{r,c}^k = P(Cell_{r,c} = Occluded | z_{r,c}^{k-1}, m_{r,c}^{k-1}, s_{r,c})$. Each cell's occlusion probability, $m_{r,c}^k$, may be based on the cell's prior occlusion probability, $m_{r,c}^{k-1}$, the currently observed data $z_{r,c}^{k-1}$, and the cell scan detection probability $s_{r,c}$. In some embodiments, each cell's occlusion probability may be spatially-independent from one another. In some embodiments, each cell may be an independent Markov model depending on either or both the current measurements and the previous state. In some embodiments, each cell may be spatially-dependent on one another and/or can be modeled with a Markov random field. In some embodiments, each cell in the map may be initialized to some small, non-zero occlusion probability $\epsilon$. The resolution of this grid need not match the resolution of the corresponding sensor FOV grid G.

Updates to the map m can occur every $\Delta T$ seconds at time $$k = \frac{T_{current} - T_{initial}}{\Delta T},$$

where $\Delta T$ is the scene scan period. Between updates, for example, incoming point clouds may be transformed from the sensor frame into the inertial frame and concatenated into a single point cloud $C^k$.

At each update k, the currently observed cells can be determined based on the inertially-referenced point cloud $C^k$. In some embodiments, a binary indicator list $z_{r,c}^k$ can be formed. For example, for each point in $c_i \in C^k$, the corresponding grid cell index (r, c) $z_{r,c}^k = 1$ can be added to the list. Cells that fall within the vehicle bounding box, for example, may be ignored. Once the list of observed cells is created, for example, all other cells may be known to be currently unobserved, $z_{r,c}^k = 0$. In some embodiments, these need not explicitly be added to the list of currently observed cells (e.g., $z_{r,c}^k$) as their value is known by exclusion. In some embodiments, all points in $C^k$ may automatically be counted as observed. In some embodiments, only points approximately at ground level may be counted as observed. In some embodiments, two or more points may be counted per cell. In some embodiments, a cell is counted as observed if at least one point falls within the cell and does not fall within the vehicle bounding box. In some embodiments, a cell may be counted as observed based on a probability distribution such as, for example, a Poisson process.

In some embodiments, once the current binary observations are determined, the grid cell probabilities may be updated. For each grid cell, $m_{r,c}^k$, in the map m, the corresponding current observation indicator $z_{r,c}^k$ can be examined. If the cell is currently observed (e.g., $z_{r,c}^k = 1$), this cell is not occluded, and the probability of occlusion is set to zero, $m_{r,c}^k=0$. If the cell is not currently observed ($z_{r,c}^k=0$), there are at least two options: the cell has already been observed or the cell has never been observed. If the cell has already been observed, it already has zero occlusion probability and this is propagated, $m_{r,c}^k=m_{r,c}^{k-1}=0$. If the cell has never been observed, then update equation may be executed.

The update equation, for example, may examine the previous occlusion probability $m_{r,c}^{k-1}$ and the scan cell detection probability $s_{r,c}$. It can be assumed, for example, that successive $s_{r,c}$ may be independent from each other. For example, if the cell scan detection probabilities are independent (or assumed to be independent through a heuristic, for example, as described below), the update equation may be performed. If the cell scan detection probability at time k is not independent of the cell scan detection probability at time k−1, then the update equation may not apply, and the previous value propagates through, $m_{r,c}^k=m_{r,c}^{k-1}$. The update can be found from:

$$m_{r,c}^k = 1-(1-s_{r,c})(1-m_{r,c}^{k-1}) \qquad \text{equation (1)}.$$

In some embodiments, this update equation may describe a sequence of Bernoulli random variables that are independent but not identically-distributed due to the parameter $s_{r,c}$, which change with each iteration k. This equation, for example, is written in a recursive format and/or may represent the probability that a cell is not observed over a sequence of observation probabilities. If the cell is not in the sensor field of view, for example, then $s_{r,c}=0$, and the probability simply propagates, $m_{r,c}^k=m_{r,c}^{k-1}$.

In some embodiments, because the sensor FOV model may not (typically) represent a random process, at least on some level of abstraction, if a vehicle is stationary, successive $s_{r,c}$ may not be independent. An independence heuristic may be used, for example, which may allow for an approximation when successive $s_{r,c}$ may be independent. Because a sensor's detections are usually spatially-repeatable (i.e. when a sensor is stationary, it gets returns from approximately the same grid cells in each scan), we choose to make this independence heuristic based on sensor movement. Since the previous iteration update, if the sensor has moved some fractional (e.g. half) amount of the grid cell size then the successive $s_{r,c}$ values are assumed to be independent and equation (1) applies. If this movement is not detected, we assume no independence and the cells in map M are not updated per the description above. A similar rule can be created for heading or rotational changes. In some embodiments, rather than relying on vehicle motion for time-independence, an algorithm may, for example, temporarily remove the spatial independence assumption to run the update equations on groups of cells according to a random process.

At each update, the map is sent to an obstacle detection and avoidance system providing information about occlusions. Occlusion information can help infer non-drivable areas.

FIG. 1 is a flowchart of an example process 100 for updating a cell according to some embodiments. The process 100 may include additional blocks, or may have blocks removed. In addition, blocks may be performed in any order. Process 100 may be executed computational system 700.

The process 100 starts at block 105 where the counter, k, is initialized to represent the first cell within a grid map M. In some embodiments, each block in the process 100 may operate on every cell within a grid map M. In such embodiments, the counter, k, may represent each time sequence for updating the grid map M.

At block 110, the process 100 may determine whether the cell under consideration (the $j^{th}$ cell) has been or is observed. As noted above, various techniques may be used to determine whether the cell under consideration has been or is observed. In some embodiments, all points in $C^k$ may automatically be counted as observed. In some embodiments, points approximately at ground level may be counted as observed. In some embodiments, two or more points may be counted per cell. As another example, a cell may be counted as observed if at least one point falls within the cell and does not fall within the vehicle bounding box.

If the cell under consideration, $C^k$, is considered observed, then process 100 proceeds to block 115, otherwise it proceeds to block 120. At block 115, the cell under consideration can be set to observed: $m_{r,c}^k=0$.

At block 120, the process 100 may determine whether independence can be assumed such as, for example, as discussed above. For example, if the sensor has moved some fractional (e.g. half) amount of the grid cell size then successive $s_{r,c}$ values are assumed to be independent. Various other techniques may be used to show independence. If independence can be assumed, the process 100 proceeds to block 125. If independence cannot be assumed, then process 100 proceeds to block 135.

At block 125, an update can be executed such as, for example, as shown in equation (1). After block 125, the process 100 may proceed to block 140 where it can be determined if the cell under consideration (the $j^{th}$ cell) is the last cell in the field of view or the last cell under consideration. If it is not the last cell, then process 100 proceeds to block 145 where the cell pointer j is incremented and the process restarts at block 110. If it is the last cell, then the process 100 proceeds to block 140 where the counter, k, is incremented, the process may be paused, and the process 100 repeats starting at block 105.

At block 135, the previous value may be propagated such as, for example, $m_{r,c}^k=m_{r,c}^{k-1}$. After block 135, process 100 proceeds to block 140.

In some embodiments, obstacle detection and avoidance systems on autonomous vehicles can includes the use of a 2D drivability grid D. This grid may represent if a vehicle can safely traverse some area. The cells nearby a projected or assigned path may be repeatedly checked for drivability. If the path or cell is not drivable, the obstacle avoidance system is configured to either stop for or maneuver around the non-drivable area.

In some embodiments, an occlusion map probability can represent one of four states: (1) Observed, (2) Unknown, (3) Not Likely Occluded, and (4) Likely Occluded. The mapping between each cell occlusion probability $m_{r,c}^k$ and examples of these states are shown in the following table:

| Cell State | Probability Range |
| --- | --- |
| Observed | $m_{r,c}^k = 0$ |
| Unknown | $m_{r,c}^k = \epsilon$ |
| Not Likely Occluded | $\epsilon < m_{r,c}^k < O_{thresh}$ |
| Likely Occluded | $O_{thresh} < m_{r,c}^k < 1$ |

The occlusion threshold, $O_{thresh}$, which differentiates Not Likely Occluded from Likely Occluded is chosen such that $\epsilon < O_{thresh} < 1$, and may tunable for the sensor, operating speed, and/or other configuration parameters. In some embodiments, the Likely Occluded state can be considered a non-drivable state and the other states may be considered drivable.

Figure 2:
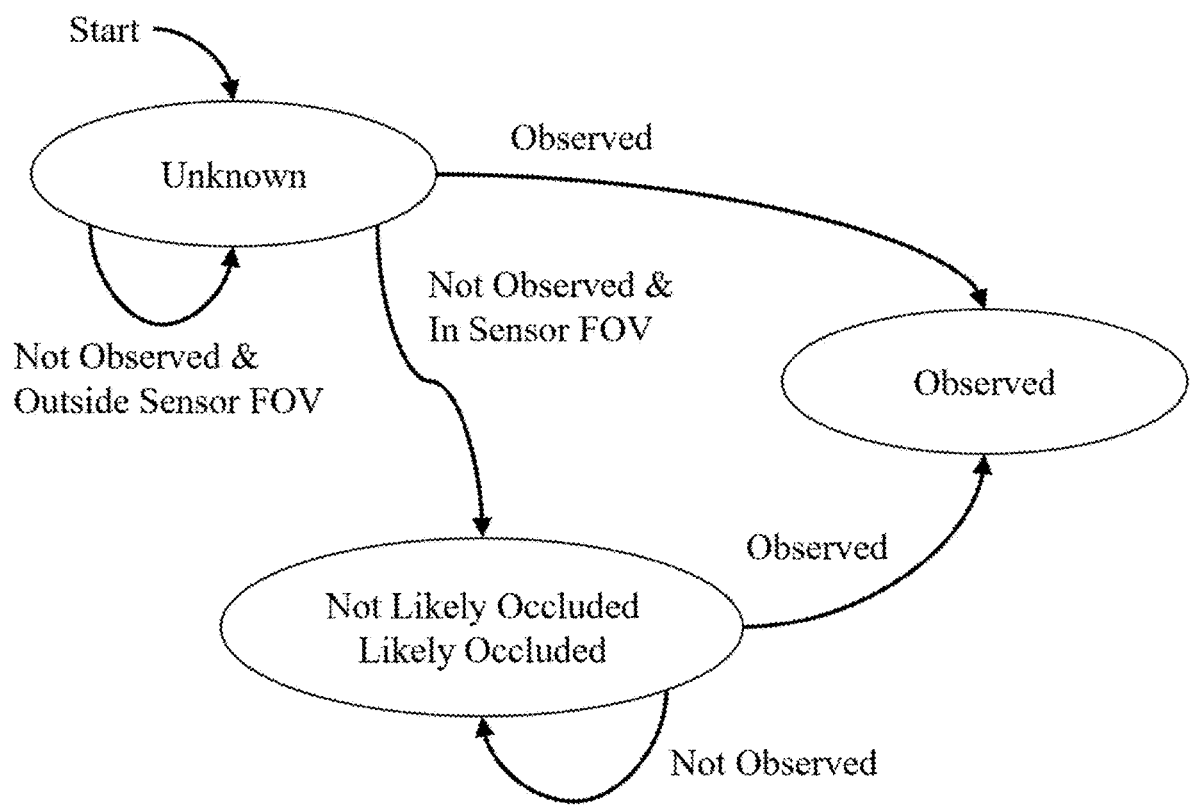
FIG. 2 is a diagram of an occlusion state transition model for each cell according to some embodiments.

FIG. 2 is a diagram of an occlusion state transition model for each cell according to some embodiments. States Not Likely Occluded and Likely Occluded are combined in this diagram because they are only differentiated by a user-defined threshold.

In some embodiments, the probability-to-state mapping may operate on each cell individually. In some embodiments, however, because small occluded areas may not be considered non-drivable for a particular application, spatial voting or filtering can take place. Different methods such as k-nearest-neighbors classification, the number of Likely Occluded cells in a Moore Neighborhood, or other techniques can be used to ensure that only larger Likely Occluded areas are marked as non-drivable in the drivability grid. In some embodiments, a spatial voting process based on the number of Likely Occluded cells in the Moore Neighborhood can be used.

As shown in FIG. 2, a cell starts off in the Unknown state and remains int the unknown state if it is determined that the cell is Not Observed and Outside the Sensor FOV. If the cell is Observed, then the state transitions to the Observed state. If a cell in the Unknown state Not Observed and In the Sensor FOV, then the cell transitions to either the Likely Occluded State or the Not Likely Occluded State depending on the threshold value. The cell remains in either of these two states until the cell becomes observed whereupon the cell transitions to the Observed state.

Figure 3A:
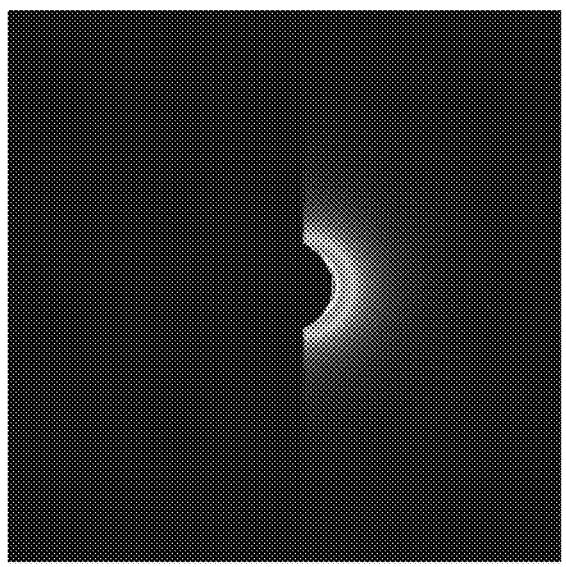
FIG. 3A is an example simulated scan probability for a sensor field of view grid G using some embodiments described in this document and FIG. 3B shows the measured scan probability for a sensor field of view.
Figure 3B:
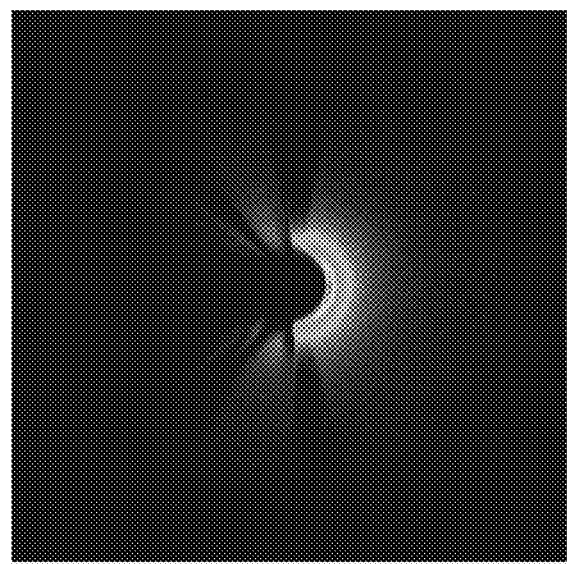

FIG. 3A is an example simulated scan probability for a sensor field of view grid G using some embodiments described in this document and FIG. 3B shows the measured scan probability for a sensor field.

Figure 4A:
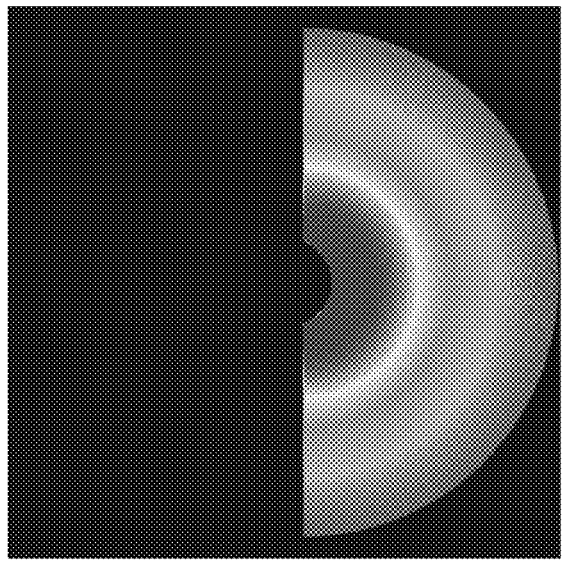
FIG. 4A is an example simulated scan cell detection probability S using some embodiments described in this document and FIG. 4B shows the measured scan cell detection probability.
Figure 4B:
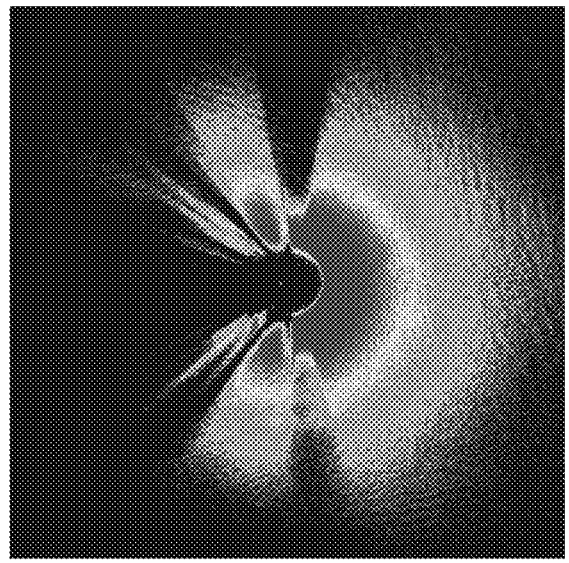

FIG. 4A is an example simulated scan cell detection probability S using some embodiments described in this document and FIG. 4B shows the measured scan cell detection probability.

Figure 5A:
FIG. 5A shows an autonomous vehicle near a drop off, which should register as an occlusion.
Figure 5B:
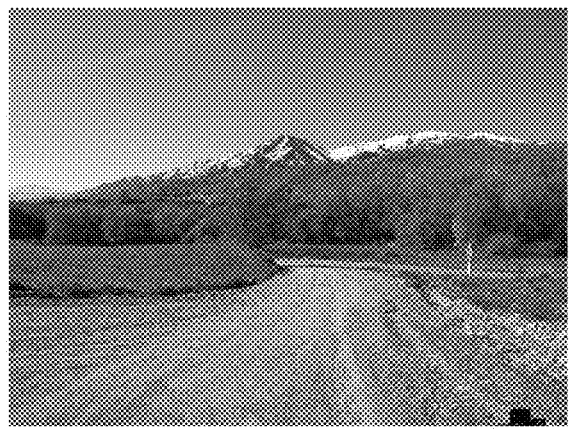
FIG. 5B shows the drop off visually from the vehicle point of view.
Figure 6:
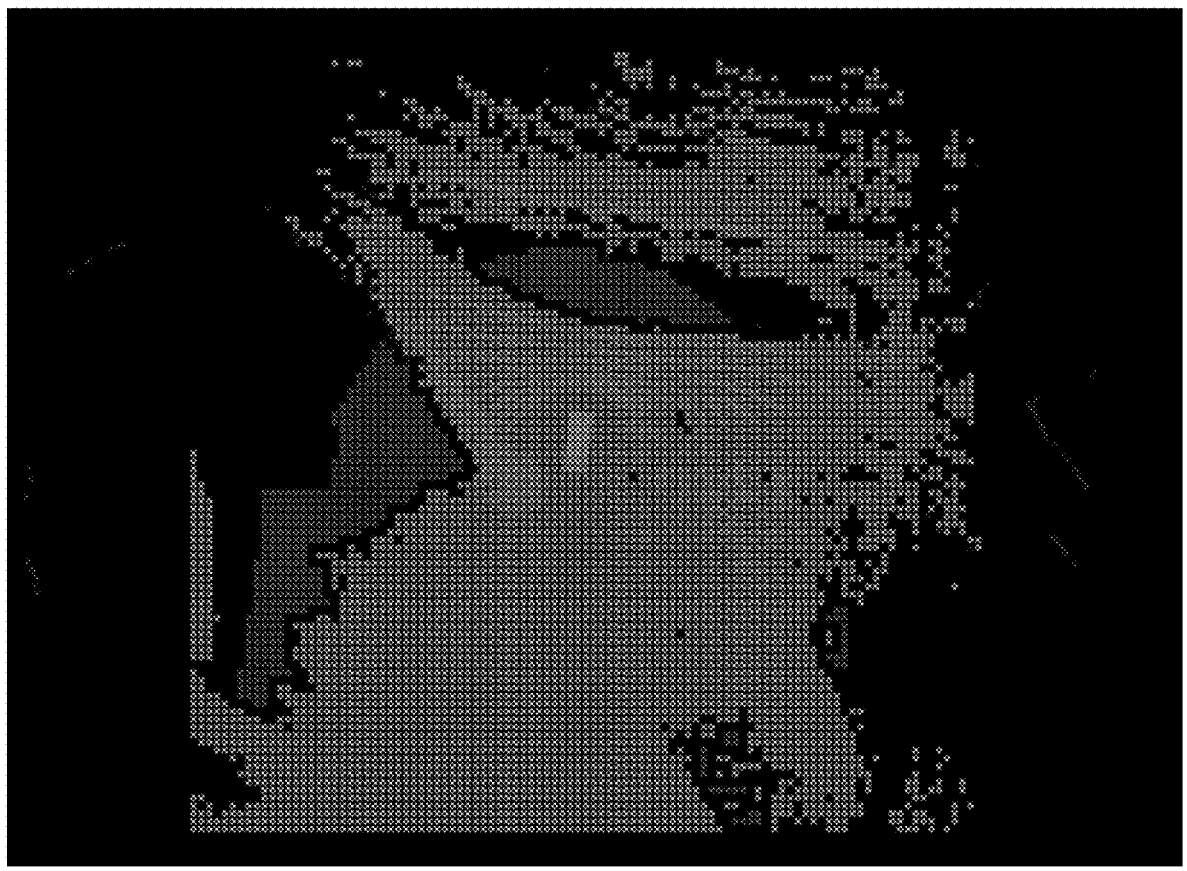
FIG. 6 shows the results from a field according to some embodiments.

FIG. 5A shows an autonomous vehicle approaching a drop off, which should register as an occlusion. FIG. 5B shows the drop off visually from the vehicle point of view. FIG. 6 shows the results. Green cells are observed, red cells have been determined to be likely occluded. The blue cells are those registered by the lidar mapping system. Unknown and Not Likely Occluded cells are not shown.

Figure 7:
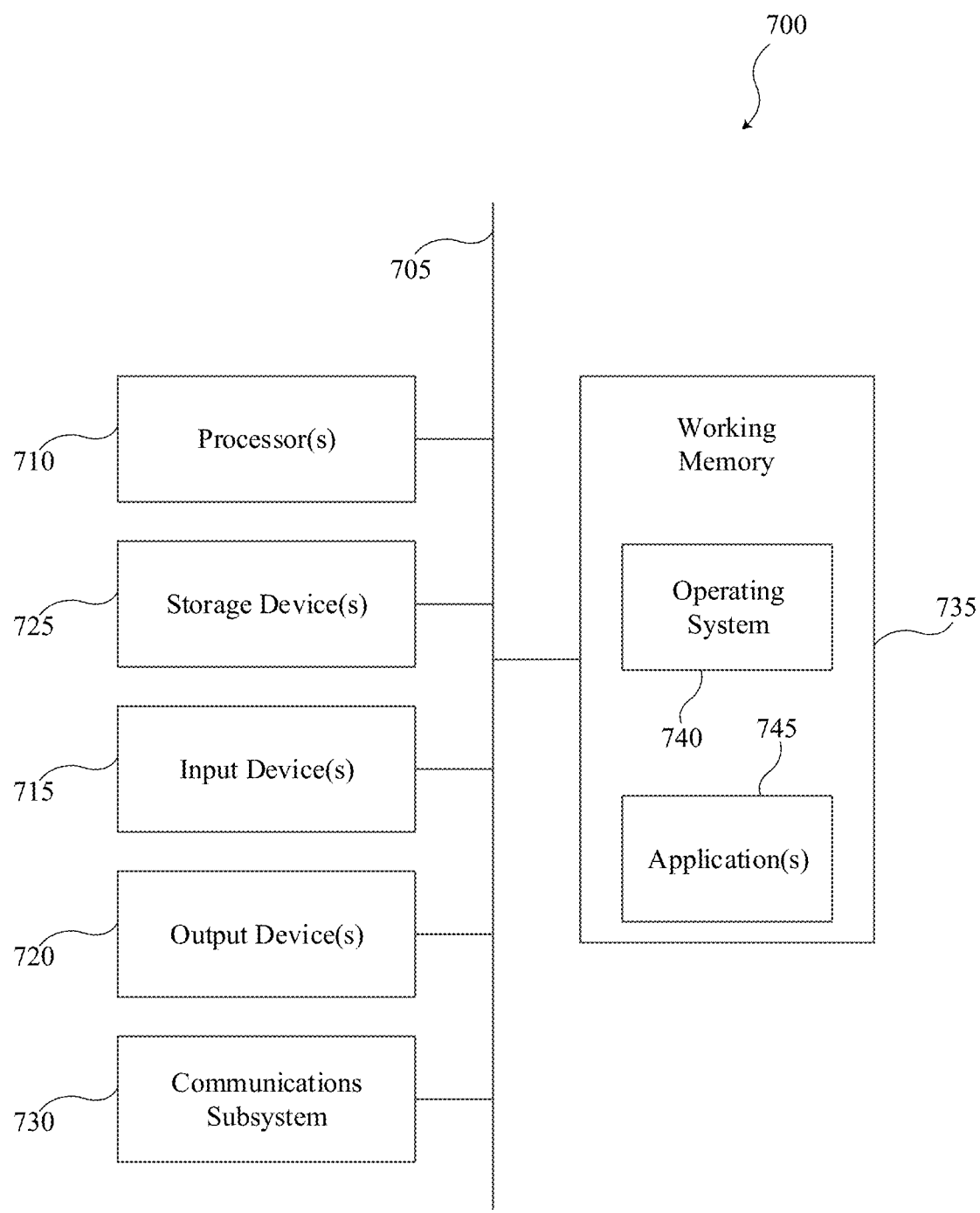
FIG. 7 shows an illustrative computational system for performing functionality to facilitate implementation of embodiments described in this document.

The computational system 700, shown in FIG. 7 can be used to perform any of the embodiments of the invention. For example, computational system 700 can be used to execute methods 500 and/or 600. As another example, computational system 700 can be used perform any calculation, identification and/or determination described here. Computational system 700 includes hardware elements that can be electrically coupled via a bus 705 (or may otherwise be in communication, as appropriate). The hardware elements can include one or more processors 710, including without limitation one or more general-purpose processors and/or one or more special-purpose processors (such as digital signal processing chips, graphics acceleration chips, and/or the like); one or more input devices 715, which can include without limitation a mouse, a keyboard and/or the like; and one or more output devices 720, which can include without limitation a display device, a printer and/or the like.

The computational system 700 may further include (and/or be in communication with) one or more storage devices 725, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 700 might also include a communications subsystem 730, which can include without limitation a modem, a network card (wireless or wired), an infrared communication device, a wireless communication device and/or chipset (such as a Bluetooth device, an 802.6 device, a Wi-Fi device, a WiMax device, cellular communication facilities, etc.), and/or the like. The communications subsystem 730 may permit data to be exchanged with a network (such as the network described below, to name one example), and/or any other devices described herein. In many embodiments, the computational system 700 will further include a working memory 735, which can include a RAM or ROM device, as described above.

The computational system 700 also can include software elements, shown as being currently located within the working memory 735, including an operating system 740 and/or other code, such as one or more application programs 745, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 725 described above.

In some cases, the storage medium might be incorporated within the computational system 700 or in communication with the computational system 700. In other embodiments, the storage medium might be separate from a computational system 700 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 700 and/or might take the form of source and/or installable code, which, upon compilation and/or installation on the computational system 700 (e.g., using any of a variety of generally available compilers, installation programs, compression/decompression utilities, etc.) then takes the form of executable code.

Unless otherwise specified, the term "substantially" means within 5% or 10% of the value referred to or within manufacturing tolerances. Unless otherwise specified, the term "about" means within 5% or 10% of the value referred to or within manufacturing tolerances.

The conjunction "or" is inclusive.

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A method comprising:
   determining whether a cell of a plurality of cells within a field of view has been observed;
   setting the occlusion probability of the cell to zero when the cell has been observed;
   when the cell has not been observed, determining whether the cell is independent;
   setting the occlusion probability of the cell to the previous occlusion probability when the cell is not independent; and
   setting the occlusion probability using an occlusion probability update function when the cell is independent, wherein the occlusion probability update function comprises $m_{r,c}^{k}=1-(1-s_{r,c})(1-m_{r,c}^{k-1})$, where $m_{r,c}^{k}$ represents the occlusion probability of map m of the cell at column c and row r for iteration k and $s_{r,c}$ represents the scan cell detection probability of the cell at column c and row r.

2. The method according to claim 1, wherein the occlusion probability update function includes a function of the scan cell detection probability and the previous occlusion probability.

3. The method according to claim 1, wherein the occlusion probability update function comprises a sequence of Bernoulli random variables.

4. The method according to claim 1, wherein determining whether the cell is independent comprises determining whether a sensor has moved some fraction amount of a grid cell size.

5. A vehicle comprising:
   a vehicle platform;
   one or more sensors coupled with the vehicle platform; and
   a processor communicatively coupled with the one or more sensors; the processor executes the method according to claim 1.

6. The vehicle according to claim 5, wherein the vehicle is an autonomous vehicle.

7. The vehicle according to claim 5, wherein the vehicle platform comprises a steering mechanism in communication with the processor, and the processor communicates steering commands to the steering mechanism based on the occlusion probability.

8. The vehicle according to claim 5, wherein the vehicle platform comprises a braking mechanism in communication with the processor, and the processor communicates braking commands to the braking mechanism based on the occlusion probability.

9. The vehicle according to claim 5, wherein the one or more sensors comprises a lidar.

10. The vehicle according to claim 5, wherein the one or more sensors comprise a depth camera, structure light camera, or a stereo camera.

11. A method comprising:
    receiving two dimensional field of view data from an optical sensor system;
    producing a probabilistic model of the sensor field of view; and
    updating an occlusion probability map using the probabilistic model and the field of view data, the occlusion probability map represents the probability that the sensor field is occluded from one or more sensors,
    wherein the occlusion probability update function comprises $m_{r,c}^{k}=1-(1-s_{r,c})(1-m_{r,c}^{k-1})$, where $m_{r,c}^{k}$ represents the occlusion probability of map m of the cell at column c and row r for iteration k and $s_{r,c}$ represents the scan cell detection probability of the cell at column c and row r.

12. The method according to claim 11, further comprising extracting nondrivable paths for a vehicle based on the occlusion probability map.

13. The method according to claim 11, wherein the optical sensor system comprises a lidar.

14. The method according to claim 11, wherein the optical sensor system comprises a digital camera.

15. A method comprising:
   receiving sensor data within a field of view;
   creating a probabilistic model of a sensor field of view;
   updating an occlusion probability map in a time sequence using the probabilistic model and the sensor data;
   determining spatial traversability map of a vehicle based on the occlusion probability map; and
   actuating the vehicle based on the spatial traversability map;
   wherein the occlusion probability update function comprises $m_{r,c}^k = 1-(1-s_{r,c})(1-m_{r,c}^{k-1})$, where $m_{r,c}^k$ represents the occlusion probability of map m of the cell at column c and row r for iteration k and $s_{r,c}$ represents the scan cell detection probability of the cell at column c and row r.

16. The method according to claim 15, wherein updating the occlusion probability map uses an independence criteria.

17. A method comprising:
   recording a field of view with a sensor of an autonomous vehicle;
   determining whether each cell of a plurality of cells in the field of view are occluded by setting an occlusion probability for each cell based on a probabilistic model of the sensor field of view; and
   determining a drivability of the autonomous vehicle based on the occlusion probability;
   wherein setting the occlusion probability comprises $m_{r,c}^k = 1-(1-s_{r,c})(1-m_{r,c}^{k-1})$, where $m_{r,c}^k$ represents the occlusion probability of map m of the cell at column c and row r for iteration k and $s_{r,c}$ represents the scan cell detection probability of the cell at column c and row r.

18. The method according to claim 17, wherein determining whether each cell of a plurality of cells in the field of view are occluded by setting an occlusion probability for each cell is also based on at least one sensor observation.

* * * * *